Oct. 16, 1956      D. L. WISE      2,766,515
PISTON PIN TOOL
Filed Oct. 9, 1952
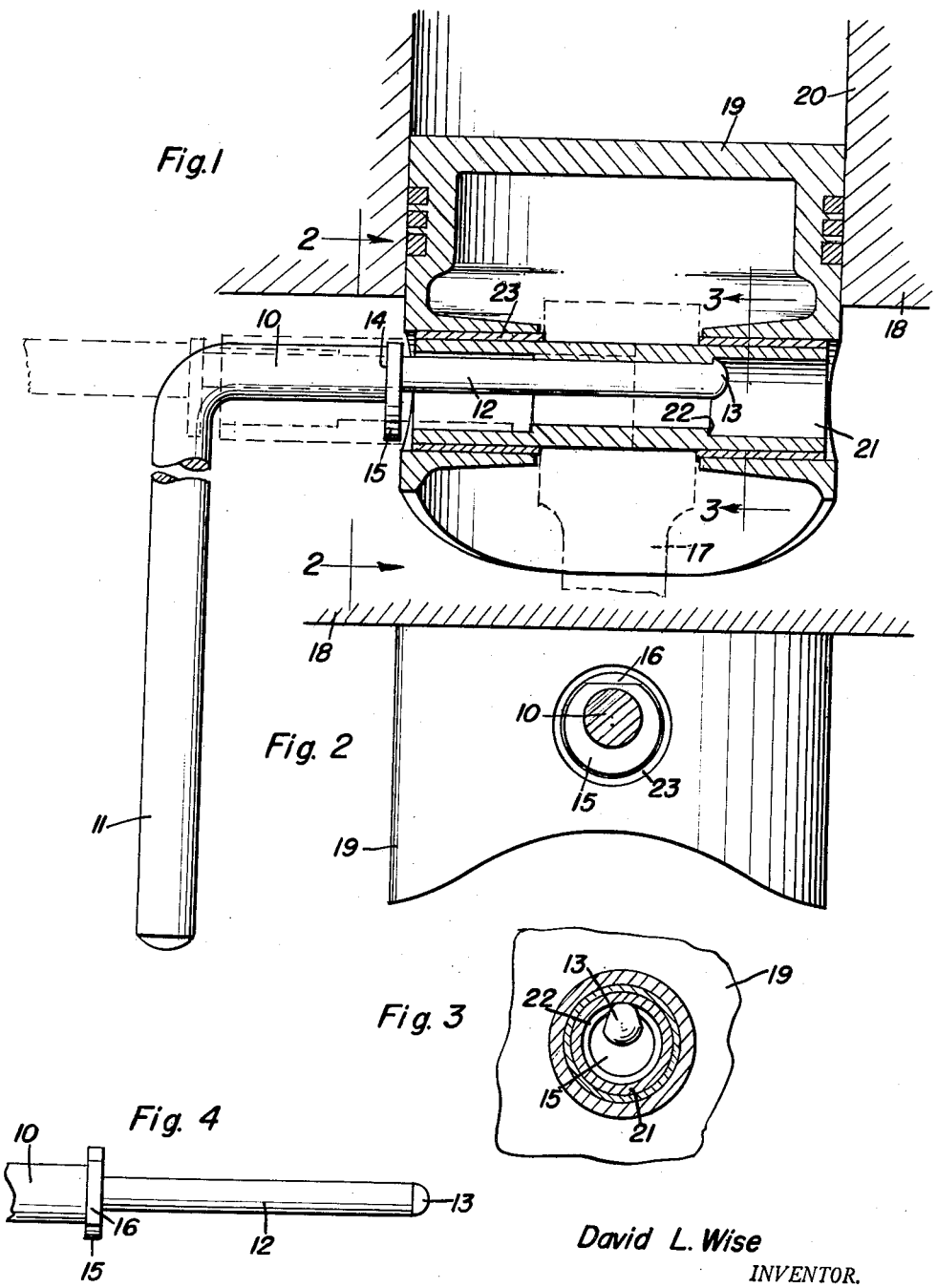
David L. Wise
INVENTOR.

United States Patent Office 2,766,515
Patented Oct. 16, 1956

2,766,515
PISTON PIN TOOL

David L. Wise, Salinas, Calif., assignor of fifty percent to Steve Hortsch, Portland, Oreg.

Application October 9, 1952, Serial No. 313,826

1 Claim. (Cl. 29—280)

The present invention relates to new and useful improvements in piston pin tools, and has for its primary object to provide, in a manner as hereinafter set forth, a device of this character comprising a simple but novel construction and arrangement whereby the pin may be expeditiously extracted from the piston at the bottom of the engine, thus permitting defective connecting rods to be removed and replaced without disturbing the head, the rocker arm assembly, etc.

Other objects of the invention are to provide a piston pin tool of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a vertical sectional view through a piston and pin showing, in side elevation, a tool constructed in accordance with the present invention engaged with said pin preparatory to removing same.

Figure 2 is a cross sectional view, taken substantially on the line 2—2 of Figure 1.

Figure 3 is a cross sectional view, taken substantially on th line 3—3 of Figure 1.

Figure 4 is a top plan view of the end portion of the tool which engages the pin.

Referring now to the drawing in detail, it will be seen that the embodiment of the invention which has been illustrated comprises a metallic shaft or shank 10 of suitable length and diameter. The shaft 10 has one end portion bent at right angles to provide an integral handle 11.

Projecting longitudinally from the other end of the shank 10 is the reduced shank 12 of a hook 13. Thus, a shoulder 14 is provided.

Fixed on the inner end portion of the shank 12 of the hook 13 in abutting engagement with the shoulder 14 is an off center collar 15. The upper portion of the collar 15 is cut away, as at 16, for a purpose which will be presently set forth.

It is felt that the manner in which the tool is used will be readily apparent from a consideration of the foregoing. Briefly, to remove the connecting rod 17, said connecting rod is disconnected from the usual crank shaft of the engine 18. The piston 19 is then lowered in the cylinder bore 20 until the pin 21 clears the bottom of the block as shown in Figure 1 of the drawing. The usual locking screw of the connecting rod 17 is then loosened, after which the hook 13 is inserted longitudinally in the pin 21 from one end thereof until the collar 15 engages the end of piston pin 21 for limiting the insertion of the hook 13 to a point just past the shoulder 22. Due to the eccentricity of the collar 15, the reduced shank 12 will be disposed adjacent the inner surface of the hollow wrist pin when the collar is engaged within the end of the tubular bearing boss having bushing 23 therein. This will assure that hook 13 will be brought into alignment with the shoulder 22 so that the operator or mechanic may then exert sufficient lateral pressure on the handle 11 to engage hook 13 with shoulder 22 and extract the pin 21 far enough to permit the connecting rod to be removed. To replace the connecting rod 17, it is alined with pin 21, the hook 13 is inserted in said pin and the collar 15 is brought into abutting engagement with the outer end thereof. The pressure on the handle 11 is then reversed for forcing the pin 21 back into the piston until one end thereof is flush with the bushing 23 disposed in the bearing boss. The cut away upper portion 16 of the collar 15 prevents said collar from striking the bottom of the engine block at all times.

It is believed that the many advantages of a piston pin tool constructed in accordance with the present invention will be readily understood and although a preferred embodiment of the device is as illustrated and described, it is to be understood that changes in the details of construction may be resorted to which will fall within the scope of the invention as claimed.

Having described the invention, what is claimed as new is:

A tool for extracting a wrist pin from a piston without removing the piston from the cylinder with the wrist pin being hollow and provided with a central inwardly projecting annular flange and the piston having spaced tubular bearing bosses with bushings disposed therein with the bushings terminating inwardly of the outer ends of the tubular bosses with the bosses being disposed below the lower end of the cylinder, said tool comprising an elongated handle member having a laterally extending shank at one end thereof, a reduced cross-sectional area extension on said shank for insertion into the hollow wrist pin with the shank generally perpendicular to a connecting rod secured to the wrist pin and the handle generally parallel to the connecting rod, an eccentrically disposed collar disposed at the inner end of the extension, said collar forming an abutment for engagement with the end of the wrist pin for limiting the insertion of the extension into the wrist pin, and a laterally extending hook projection on the free end of said extension for engagement with a shoulder formed by the end of the flange in said wrist pin whereby lateral force may be exerted on said handle for extracting the wrist pin, said extension and lateral hook projection having a cross-sectional area substantially less than the area of the interior of the wrist pin whereby the eccentric collar will position the extension adjacent the inner surface of the flange for positioning the hook projection in engagement with the end of the flange when the collar is disposed in the end of the tubular bearing boss.

References Cited in the file of this patent

UNITED STATES PATENTS

| | | |
|---|---|---|
| 1,589,633 | Dunton et al. | June 22, 1926 |
| 1,632,482 | Kroells | June 14, 1927 |
| 2,471,557 | Bishop | May 31, 1949 |